United States Patent [19]

Jones

[11] 4,366,669
[45] Jan. 4, 1983

[54] TANK CLOSURE APPARATUS WITH SAFETY FEATURE

[75] Inventor: David W. Jones, East Northport, N.Y.

[73] Assignee: Shaw Aero Devices, Inc., East Hampton, N.Y.

[21] Appl. No.: 236,340

[22] Filed: Feb. 20, 1981

[51] Int. Cl.³ .................. F02G 3/00; B64D 37/02; B65D 51/00
[52] U.S. Cl. ..................... 60/39.09 R; 244/135 R; 220/203; 220/204
[58] Field of Search ............ 60/39.09; 251/63.6, 251/63.5, 62; 137/587, 588, 589; 220/202, 204, 203, 246, 303, 231; 244/135 R; 217/102

[56] References Cited

U.S. PATENT DOCUMENTS

| 396,961 | 1/1889 | Smith | 217/102 |
| 2,306,699 | 12/1942 | Johnson | 220/246 |
| 2,414,909 | 1/1947 | Snyder | 244/135 R |
| 3,910,551 | 10/1975 | Defrees | 251/63.6 |

Primary Examiner—Louis J. Casaregola
Assistant Examiner—Donald E. Stout
Attorney, Agent, or Firm—Pennie & Edmonds

[57] ABSTRACT

A tank closure apparatus comprising a housing adapted to attach to a tank. A filler-cap assembly seals a liquid filling port of the housing. Passageways carry liquid from this port to openings on a surface of the housing within the tank. A means, responsive to a pressure generated by a pressure generating device, which supplies pressure coterminously with the operation of a process or a vehicle propulsion means, causes a sealing member to cover the passageway openings, providing a seal should the operator forget to close the filler cap.

13 Claims, 6 Drawing Figures

TANK CLOSURE APPARATUS WITH SAFETY FEATURE

TECHNICAL FIELD

This invention relates to the field of fluid handling. More particularly, it relates to assemblies used to safely and securely open, fill and seal a fuel or process tank.

BACKGROUND ART

Fuel tanks on vehicles and often tanks used to hold reagents for chemical processes must have openings through which liquids can be made to flow into such tanks. The art of filler-cap assemblies is well developed. A simple example is the ordinary filler-cap used for the gasoline tank of an automobile.

In the case of an automobile the consequences of leaving the cap off after filling or the cap being somehow mechanically dislodged are usually not great. In the case of for example the oil tank associated with a jet engine however, leaving the filler-cap off could result eventually in engine failure. In many processes hazardous chemical compounds could be released from a tank as a result of the failure to properly seal the tank.

It is of course possible to provide electro-mechanical devices to signal the fact that a closure device is not properly positioned or to provide a signal which inhibits the start of a process. There are times however, when this approach is not sufficiently reliable, is too costly or when general application considerations cause it to be undesirable.

DISCLOSURE OF THE INVENTION

The present invention provides an apparatus for safely and reliably sealing a fuel or process tank. A conventional fuel tank or filler cap is used as the primary sealing means which for example the vehicle operator in the case of a fuel tank or the process operator in the case of a chemical tank uses to cover an opening in a housing through which liquid is introduced into the tank. Passageways are provided from this first opening to passageway openings on a surface of the apparatus within the tank. A sealing member which moves into place to cover the passageway openings on this surface moves in response to a means responsive to a pressure which is associated with the operation of a pressure producing device such as the propulsion means within the vehicle in which the tank is mounted. In a preferred embodiment a chamber within the body of the apparatus serves the function of a cylinder, housing a piston which moves in response to the pressure associated with the process or operation. This pressure may have its origin outside of the fuel tank and is coterminous with the operation of the process or vehicle propulsion means. A piston rod which is attached to the piston at one end and the sealing member at the other serves as the means responsive to pressure for moving the sealing member from a first position in spaced relationship to the surface to a second position in contact with the surface. A return means such as a spring is provided for moving the sealing member to its first position when the external pressure is released.

BEST MODE FOR CARRYING OUT THE INVENTION

Figure 1:
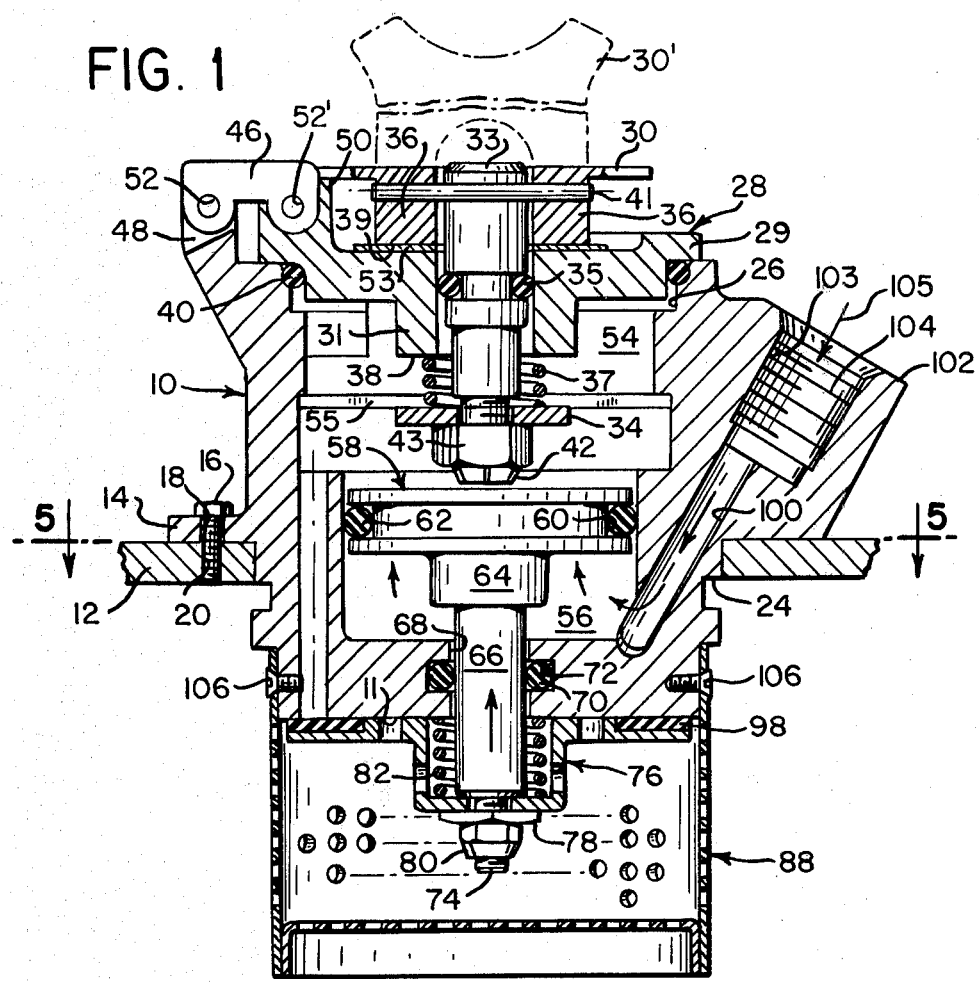
FIG. 1 is a cross sectional side elevation view of a tank closure apparatus according to the present invention, shown in the closed and sealed configuration.
Figure 3:
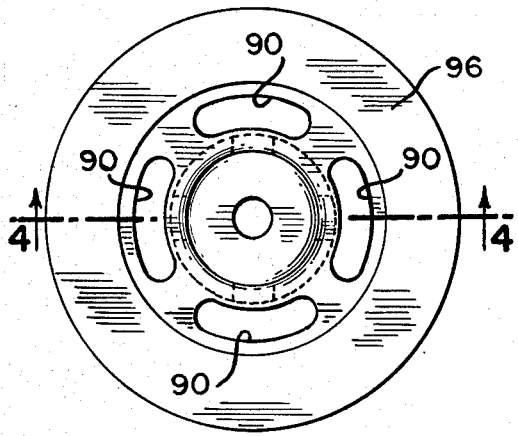
FIG. 3 is a top plan view of the sealing member used in the preferred embodiment.
Figure 2:
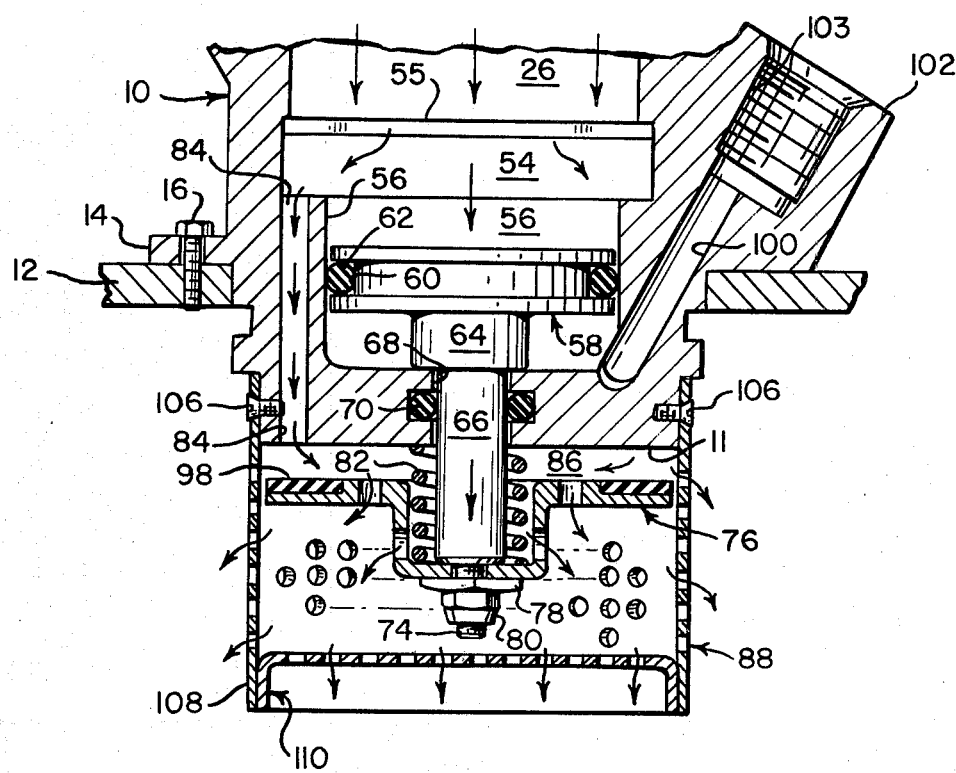
FIG. 2 is a view similar to FIG. 1 with the conventional filler cap assembly not shown and the apparatus in the unsealed or filling configuration.

As shown in FIGS. 1 and 2 the tank closing assembly of this invention comprises a generally cylindrical housing 10 which is adapted to fit in an opening in a tank wall 12. It is similar in shape to this opening, a portion of the body fitting within the opening with preferably very little play or lateral movement. A flange or a plurality of other suitable extensions 14 of the housing 10 in a direction parallel to the tank are provided to aid in attaching to the tank wall. In the embodiment shown a machine screw 16 fits through a hole 18 in flange 14 and is threaded into a hole 20 in tank wall 12. It is understood that other means of attaching housing 10 to tank wall 12 may be used. An alternative, also permitting removal of the housing 10 from tank wall 12, possibly for servicing, would require providing mating threads, not shown, on housing 10 and tank wall 12. Usually, it will be desirable to provide a fairly impervious seal between housing 10 and tank wall 12. This can be provided by the use of a suitable gasket between flange 14 and wall 12 as is well known in the art.

Figures 5, 5A:
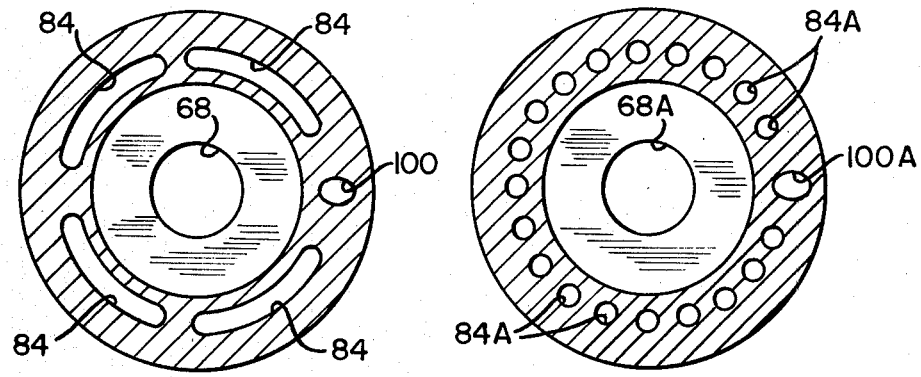
FIG. 5 is a cross sectional view taken along line 5—5 the FIG. 1.
FIG. 5A shows an alternate embodiment of the cross section illustrated in FIG. 5.

Housing 10 may be of a generally cylindrical shape thus having a circular cross section as illustrated in FIGS. 5 and 5A. An opening 26 adapted to receive liquids and preferably of circular cross section, is sealed by a filler cap assembly 28. Filler cap assembly 28 may be of several kinds well known in the art as are typically used to seal fuel tanks, radiators in automobiles, oil tanks on boats, or oil tanks associated with jet engines that hold the oil which lubricates the jet engine.

In the preferred embodiment filler cap 28, of the type used on an oil tank associated with a jet engine, is comprised of a cap body 29 generally in the form of a flat cylinder with a cylindrical extension 31. A central shaft 33 to which a lever 30 is pivotally connected by means of pin 41 is sealed against the wall of an opening in the center of cap body 29 by O-ring 35. The lower end of shaft 33 is connected to an anchor plate 34 which is keyed to rotate with shaft 33 and is secured to a threaded extension 42 of shaft 33 by means of nut 43. A spring 37 and lever 30 provide a camming action when pivoted as described below by retaining anchor plate 34 at a distance away from the lower surface 38 of cylindrical extension 31, the distance being limited only by contact of portions of lever 30 with the top of a washer 53 disposed between lever 30 and filler cap body 29.

As shown in FIG. 1 filler cap assembly 28 is in the locked position. A good seal is provided between housing 10 and filler cap assembly body 29 by O-ring 40. Lever assembly 30, pivotally connected to shaft 33 by pin 41, may be pivoted upward by manually moving its extension as shown by 30' in dashed lines. When pivoted up short finger extensions 36 rather than lower surface 39 of lever 30 contact washer 53, allowing anchor plate 34 to be lowered away from intimate physical contact with a ledge 55 within housing 10, as a result of the action of spring 37. Lever assembly 30 may then be turned, rotating shaft 33 and anchor plate 34. After sufficient rotation anchor plate 34 will assume a position where no portion of it is below ledge 55 thus permitting anchor plate 34 to pass adjacent to ledge 55 as filler cap 28 is lifted away from housing 10. While anchor plate 34 has been described as rectangular in shape it is recognized that other shapes and configurations which have portions that may be rotated under and away from ledge 55 may be used. This arrangement of components for locking and unlocking filler cap 28 is well known in the art.

It is desirable that filler cap 28 be retained within the vicinity of housing 10 to prevent loss or damage. Very often this result can be achieved by connecting filler cap 28 to housing 10 with a short metal chain or other flexible securing device. In the embodiment shown however, a hinge 46 is provided between vertical extension 48 of housing 10 and vertical extension 50 of filler cap body 29. Securing pins 52 and 52' located in holes in extensions 48 and 50 respectively, pivotally connect hinge 46 to extentions 48 and 50. When filler cap assembly 28 is unlocked it is simply pulled upward away from housing 10 at the side opposite hinge 46 and pivots upward while remaining attached to housing 10 by means of hinge 46.

Referring to FIG. 2 it is assumed that filler cap assembly 28 has been pivoted upwards after appropriate manipulation of lever 30 thus exposing opening 26. Opening 26, preferably circular and adapted to accept filler cap assembly 28, can now accept liquid which is to be supplied to the tank. Opening 26 is associated with a cavity 54 into which this liquid is introduced. Preferably opening 26 and cavity 54 accept a filling nozzle of the type well known in the art. Under some conditions however, liquid may simply be poured in to opening 26 thus entering cavity 54 and passing by ledge 55. Located centrally within housing 10 is cylinder 56 which opens upon cavity 54. A piston assembly 58 is disposed within cylinder 56. An annular groove 60 is provided for O-ring 62 which seals piston assembly 58 to the walls of cylinder 56. A piston rod 66 is attached to a cylindrical extension 64 of piston assembly 58. It may be possible to form piston assembly 58, extension 64 and piston rod 66 integrally through one series of operations or alternatively piston rod 66 may have an end threaded into extension 64. Piston rod 66 is sealed to housing 10 as it passes through an opening 68 within housing 10 by an O-ring 70 disposed in annular channel 72. Piston rod 66 is provided with a threaded extension 74 upon which a sealing member 76 may be mounted by use of washer 78 and nut 80. A spring 82 or other suitable biasing means which may be disposed around piston rod 66 between the lower surface 11 of housing 10 and sealing member 76 serves to urge sealng member 76 away from housing 10 thereby also pulling piston 58 down within cylinder 56 as a result of the motion of piston rod 66 as shown in FIG. 2.

As can be inferred from FIG. 1, dimensions should be chosen so that extension 42 of rotating shaft 33 does not contact piston assembly 58 when it is lowered during unlocking of filler cap 28. If necessary a recess, not shown, can be provided in piston assembly 58 to prevent contact with extension 42.

Usually, filler cap 28 will be unlocked by appropriate manipulation of lever 30 as discussed above and pivoted away from opening 26 only when the process associated with the tank upon which the tank closure apparatus is being used is not in operation. For example, if the tank is an oil tank for a jet engine, filler cap 28 would be pivoted up or open only when the engine was not operating and it was an appropriate time to add oil to the tank. Oil entering cavity 54 through, for example, a nozzle adapted to enter opening 26 would pass adjacent ledge 55 and into at least one passageway such as 84 through which a liquid may pass from cavity 54 which may be located spatially outside the tank to region 86 which may be located within the tank. While only one such passage 84 is shown in FIGS. 1 and 2 reference may be made to FIGS. 5 and 5A which show a plurality of such passageways. In FIG. 5 four curved slots are provided to serve as passageways between cavity 54 and region 86. In FIG. 5A a series of circular passageways serves the same purpose.

Liquid flowing through passageways 84 and entering region 86 must pass through a screen assembly 88 or openings in sealing member 76 and subsequently through mesh openings in screen assembly 88 to reach the bulk of liquid located in the tank, generally below the tank closure apparatus.

Figure 4:
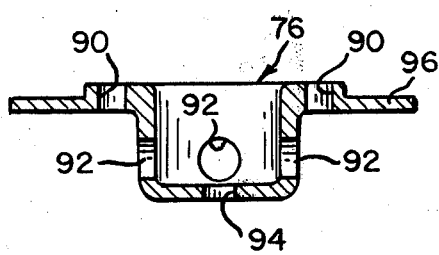
FIG. 4 is a cross sectional view taken along line 4—4 of FIG. 3.

Sealing member 76 consists of a cup shaped section with a flange connected to its open end as can be seen by referring to FIG. 4. Openings 90 in the flange surface which may be curved slots and openings in the walls of the cup portion 92 which are generally circular, reduce opposition to the flow of liquid caused by sealing member 76. An opening 94 is provided at the bottom of the cup section of sealing member 76 to allow mounting on extension 74 of piston rod 66. An annular shoulder 96 is provided on sealing member 76 to accommodate an elastomeric gasket 98 formed from material resistant to deterioration caused by the liquid within the tank. O-ring seals used throughout the apparatus should be formed of this same material or a similarly resistant material.

In this embodiment surface 11 upon which passageways 84 open is planar. The openings are arranged in an annular band on this surface. Dimensions are selected so that the elastic washer 98 will cover this annular band when sealing member 76 moves up against surface 11.

When the filling operation is complete, filler cap 28 is lowered over opening 26 and handle 30 is manipulated to lock filler cap 28 in place. If however, an operator of a process or a vehicle containing a tank fitted with the tank closure apparatus of this invention should forget to seal opening 26 with filler cap 28 in this manner, the apparatus provides protection against loss of fluid. A passageway 100 in an extension or shoulder 102 of housing 10 connects cylinder 56 at a point below piston assembly 58 to a cylindrical opening 103 in shoulder 102 fitted by some means of connecting to a pressure source. Threads 104 may be provided to couple a tube carrying an external pressure represented by arrow 105 which is available from a pressure generating device only when the process is in operation. This pressure applied to the bottom of piston assembly 58 serves to move assembly 58 against the force of spring 82 transmitted by piston rod 66. Sealing member 76 is thus moved into intimate physical contact with the lower surface of housing 10. Elastomeric gasket 98 then effectively covers and seals passageways 84 preventing fluid from being released from the tank even if filler cap 28 has not sealed opening 26 for as long as the process continues or, for example, as long as an engine is operating and supplying a pressure through passageway 100 to the part of cylinder 56 behind or below piston assembly 58. This seal will be maintained during the operation of the pressure producing device until operation ceases at which time the pressure, which is conterminous with the operation of the process or engine, is automatically relieved. For example, when used with oil tanks associated with jet engines, the engine bleed, a mixture of oil and air, may be used to supply the pressure. When the engine is turned off, the pressure drops to zero. At that time spring 82 urges sealing member 76 away from surface 11 of housing 10 until piston extension 64 contacts housing 10 limiting the motion. At this point, the tank is again open by virtue of passageways 84 and filling can again commence.

In this embodiment the surface upon which passageways 84 open and the mating surface of sealing member 76 are planar. While this is perhaps the simplest configuration for purposes of manufacture the invention is not limited to this particular configuration. Other shapes of surfaces can be used as long as sealing member 76 generally conforms to these shapes so that effective sealing of passageways can be accomplished.

It will be understood by one skilled in the art that when a tank is fitted with the apparatus of this invention it may be useful to have a tank vent located at some portion of the tank above the maximum liquid level, to allow adequate venting as filling occurs. This vent can be in the form of a valve which allows gas in a tank to escape but does not permit the flow of liquid from within the tank. For most applications however, such a vent may not be necessary.

Screen assembly 88 which telescopes over housing 10 is secured to housing 10 by means of a number of set screws 106 threaded into radial holes in housing 10. Screen assembly 88 is comprised of a tubular member 108 and a cup shaped member 110 that are crimped or welded together. Screen assembly 88 with mesh openings in both tubular part 108 and cup shaped part 110 form a screen which prevents particles larger than the mesh size which may be introduced in the filling process from entering the tank.

The components used in the apparatus of this invention for purposes other than sealing may be formed from a high grade stainless steel, but other suitable materials may be used which are compatible in terms of, for example, corrosion, with the liquid to be handled.

While the apparatus of this invention does not have to be of any particular size, in the preferred embodiment opening 26 may have a diameter of approximately 1.6 inches (4.06 cm). In this case passageways 84 should have a combined cross sectional area of at least approximately 0.5 square inches (3.23 square cm).

I claim:

1. A tank closure apparatus for sealing a tank when a pressure generating device is operative comprising:
    (a) a housing adapted to attach to the tank;
    (b) a first opening in the housing for accepting liquids, said first opening adapted to be sealed by a filler cap assembly;
    (c) a surface of said housing disposed within the tank;
    (d) at least one passageway extending from said first opening to passageway openings on said surface;
    (e) a sealing member movable from a first position in spaced relationship to said surface to a second position in contact with said surface and covering said passageway openings; and
    (f) means responsive to said pressure generated by said device for moving said sealing member from said first position to said second position.

2. The tank closure apparatus of claim 1 wherein said pressure generating device is the bleed port of a jet engine.

3. The tank closure apparatus of claim 1 wherein the tank is the oil tank associated with a jet engine.

4. The tank closure apparatus of any of claims 1, 2 or 3 wherein said means for moving said sealing member comprises:
    (a) a piston within a cylinder in said housing;
    (b) a piston rod connected to said piston;
    (c) means for attaching said piston rod to said sealing member, and
    (d) means of supplying said pressure to said cylinder to move said piston, piston rod, and sealing member, whereby said sealing member is moved to said second position.

5. The tank closure apparatus of claim 4 wherein:
    (a) an end of said piston rod extends externally from said housing; and
    (b) said sealing member is in facing relationship to said surface externally of said housing.

6. The tank closure apparatus of claim 5 wherein the sealing member comprises:
    (a) a cup shaped section with an opening facing said surface, said section adapted to fit over the end of said piston rod; and
    (b) a flange portion connected integrally with said cup shaped section at the cup opening extending radially from said cup shaped section parallel to said surface; said flange portion adapted to cover at least said passageway openings.

7. The tank closure apparatus of claim 6 wherein the flange portion is adapted to contain an elastomeric gasket to cover said passageway openings.

8. The tank closure apparatus of claim 6 wherein the cup shaped section and the flange portion contain openings to reduce opposition to the flow of liquids when said sealing member is in said first position.

9. The tank closure apparatus of any of claims 1, 2 or 3 wherein said surface is planar.

10. The tank closure apparatus of any of claims 1, 2 or 3 wherein the passageway openings on said surface define an annular band of openings on said surface.

11. The tank closure apparatus of any of claims 1, 2 or 3 further comprising means for biasing said sealing member toward said first position.

12. The tank closure apparatus of claim 11 wherein the means for biasing said sealing member toward said first position is a coil spring.

13. The tank closure apparatus of any of claims 1, 2 or 3 further comprising a screen of a given mesh size enclosing said surface and sealing member to exclude particles larger than said given screen mesh size.

* * * * *